(12) United States Patent
Feldtkeller

(10) Patent No.: US 9,130,478 B2
(45) Date of Patent: Sep. 8, 2015

(54) RECTIFIER WITH BRIDGE CIRCUIT AND PARALLEL RESONANT CIRCUIT

(71) Applicant: Infineon Technologies AG, Neubiberg (DE)

(72) Inventor: Martin Feldtkeller, Munich (DE)

(73) Assignee: Infineon Technologies AG, Neubiberg (DE)

( * ) Notice: Subject to any disclaimer, the term of this patent is extended or adjusted under 35 U.S.C. 154(b) by 144 days.

(21) Appl. No.: 13/789,950

(22) Filed: Mar. 8, 2013

(65) Prior Publication Data

US 2014/0254224 A1 Sep. 11, 2014

(51) Int. Cl.
*H02M 7/00* (2006.01)
*H02M 7/5387* (2007.01)
*H02M 7/219* (2006.01)

(52) U.S. Cl.
CPC ............ *H02M 7/5387* (2013.01); *H02M 7/219* (2013.01); *H02M 2007/2195* (2013.01); *Y02B 70/1408* (2013.01); *Y02B 70/1441* (2013.01)

(58) Field of Classification Search
USPC ................................................. 363/125–128
See application file for complete search history.

(56) References Cited

U.S. PATENT DOCUMENTS 5,398,182 A * 3/1995 Crosby ............................ 363/89
5,583,424 A * 12/1996 Sato et al. ...................... 323/282
5,886,889 A * 3/1999 Escallier ......................... 363/69
6,349,047 B1 * 2/2002 Yu ................................. 363/127
2005/0073285 A1 * 4/2005 Schlaffer ....................... 323/229
2006/0227582 A1 * 10/2006 Wei et al. ...................... 363/126
2007/0210364 A1 * 9/2007 Kato et al. .................... 257/296
2008/0205108 A1 * 8/2008 Takada et al. ................. 363/126

OTHER PUBLICATIONS

Wikipedia, "Diode Bridge," Wikipedia, the free encyclopedia, downloaded from en.wikipedia.org/wiki/Diode_bridge, date last modified: Feb. 26, 2013, 6 pages.
Wikipedia, "Bridge Circuit," Wikipedia, the free encyclopedia, downloaded from en.wikipedia.org/wiki/Bridge_circuit, date last modified: Feb. 27, 2013, 4 pages.
Wikipedia, "H bridge," Wikipedia, the free encyclopedia, downloaded from en.wikipedia.org/wiki/H_bridge, date last modified: Mar. 7, 2013, 4 pages.
Wikipedia, "Rectifier," Wikipedia, the free encyclopedia, downloaded from en.wikipedia.org/wiki/Rectifier, date last modified: Mar. 7, 2013, 17 pages.

* cited by examiner

*Primary Examiner* — Adolf Berhane
*Assistant Examiner* — Gary Nash
(74) *Attorney, Agent, or Firm* — Slater & Matsil, L.L.P.

(57) ABSTRACT

A rectifier circuit includes a bridge circuit configured to receive an alternating input signal. A parallel resonant circuit is coupled between the bridge circuit and an output. The circuit could also include a capacitive storage element coupled to the output and configured to provide an output signal.

18 Claims, 9 Drawing Sheets

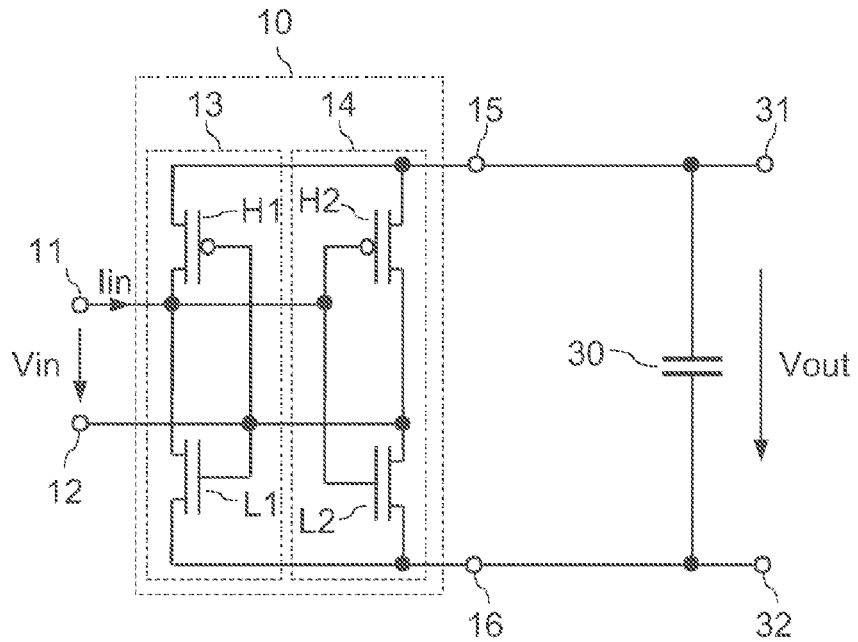
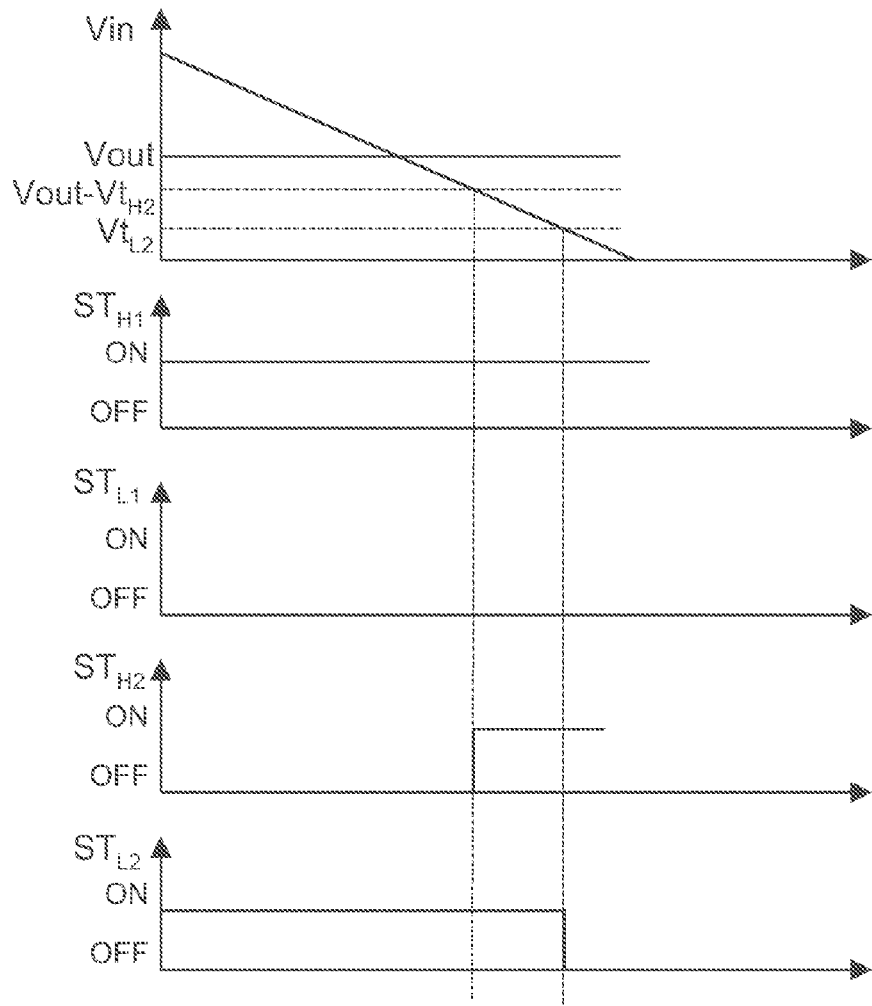
FIG 1
FIG 2A

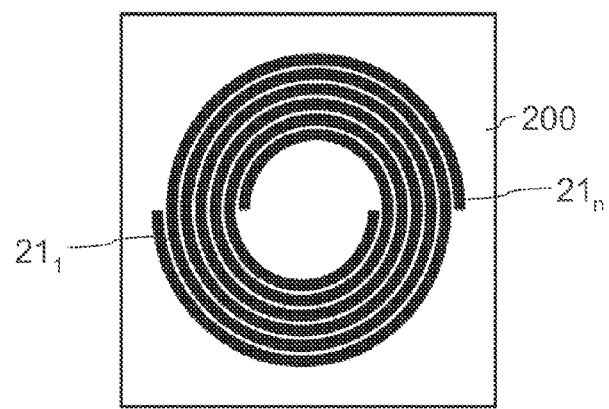
FIG 10
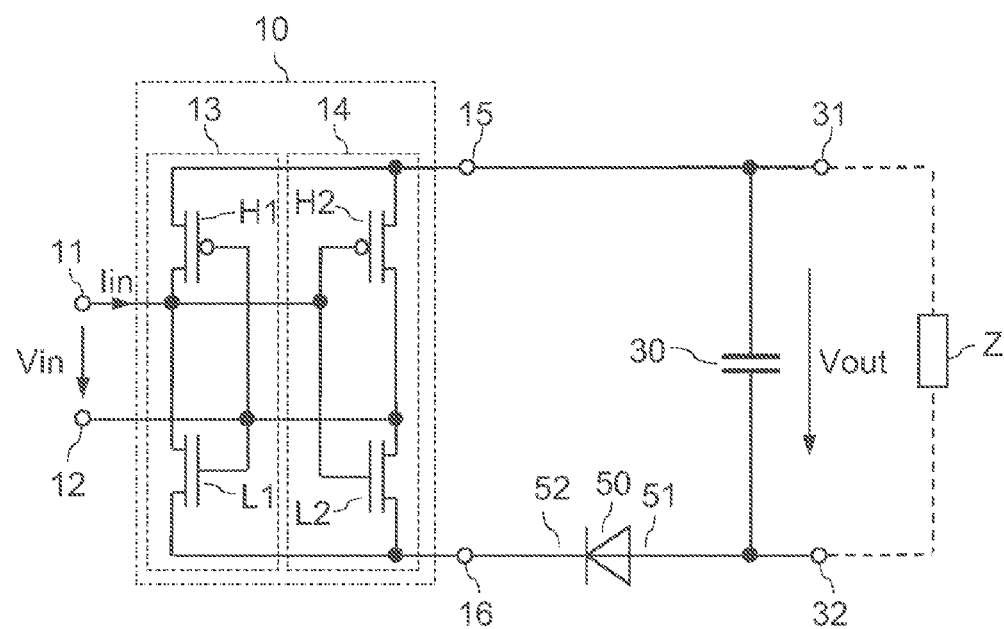
FIG 11
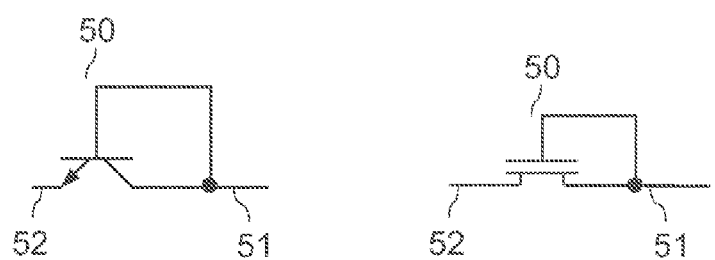
FIG 12A
FIG 12B

RECTIFIER WITH BRIDGE CIRCUIT AND PARALLEL RESONANT CIRCUIT

TECHNICAL FIELD

Embodiments of the present invention relate to a rectifier circuit, such as a rectifier circuit for rectifying an alternating input voltage with a relatively high frequency for energy transmission.

BACKGROUND

In many different electronic circuit applications it is necessary to rectify an alternating input voltage in order to provide a direct output voltage. One possible application is power transmission over a potential barrier. It is commonly known that power can be transmitted over a potential barrier using a transformer that includes a primary winding and a secondary winding. In this type of application, an alternating power signal is applied to the primary winding of the transformer. By virtue of the secondary winding being inductively coupled to the primary winding the alternating power signal received by the primary winding causes an alternating power signal to be available at the secondary winding. The power signal applied to the primary winding and the power signal available at the secondary winding may have different signal waveforms, but substantially have the same frequency.

Depending on the specific type of transformer used to transmit the power, the frequency of the alternating power signal can be relatively high in order to efficiently transmit power over the transformer. Especially transformers that are very small and/or that do not include a magnetic core may require frequencies higher than several 10 MHz, and in even higher than 100 MHz.

SUMMARY OF THE INVENTION

A first embodiment relates to a rectifier circuit. The rectifier circuit includes a bridge circuit configured to receive an alternating input signal, and a parallel resonant circuit coupled between the bridge circuit and an output, wherein the output is configured to output an output signal.

A second embodiment relates to an electronic circuit. The electronic circuit includes a plurality of rectifier circuits, wherein each rectifier circuit includes a bridge circuit configured to receive an alternating input signal, and a parallel resonant circuit coupled between the bridge circuit and an output, wherein the outputs of the rectifier circuits of the plurality of rectifier circuits are cascaded.

A third embodiment relates to a rectifier circuit. The rectifier circuit includes a bridge circuit configured to receive an alternating input signal, and a rectifier element coupled between the bridge circuit and an output, wherein the output is configured to output an output signal.

A fourth embodiment relates to an electronic circuit comprising a plurality of rectifier circuits. Each rectifier circuit includes a bridge circuit configured to receive an alternating input signal, and a parallel resonant circuit coupled between the bridge circuit and an output, wherein the outputs of the rectifier circuits of the plurality of rectifier circuits are cascaded.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like features.

FIG. 1 illustrates a rectifier circuit including a bridge circuit;

FIG. 10 illustrates an embodiment of inductors of two different parallel resonant circuits;

FIG. 11 illustrates one embodiment of a rectifier circuit including a bridge circuit and a rectifier element coupled between the bridge circuit and an output of the rectifier circuit;

FIG. 12 (which includes FIGS. 12A and 12B) illustrates possible implementations of the rectifier element;

Figure 2B:
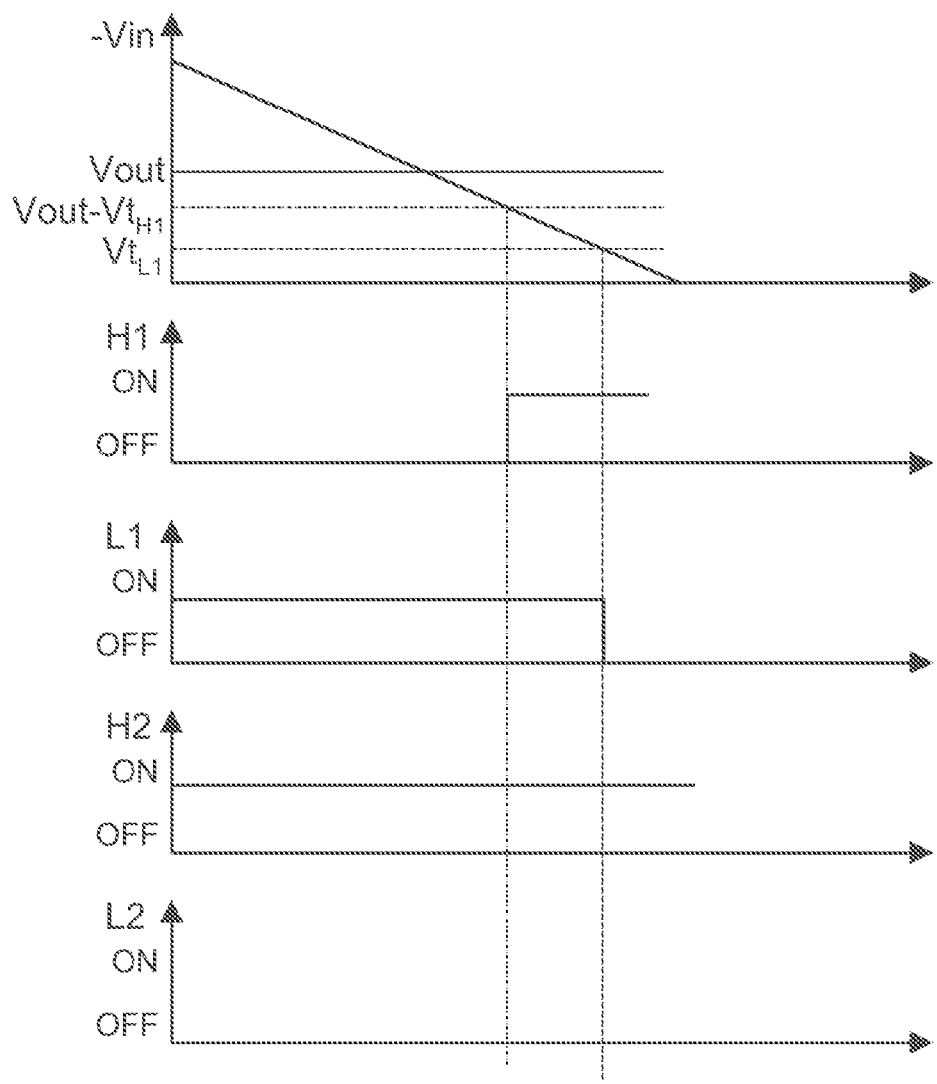
FIG. 2 (which includes FIGS. 2A and 2B) illustrates the operating principle of the rectifier circuit of FIG. 1.

In the following detailed description, reference is made to the accompanying drawings. The drawings form a part of the description and by way of illustration show specific embodiments in which the invention may be practiced. It is to be understood that the features of the various embodiments described herein may be combined with each other, unless specifically noted otherwise.

DETAILED DESCRIPTION OF ILLUSTRATIVE EMBODIMENTS

FIG. 1 illustrates one embodiment of a rectifier circuit. The rectifier circuit includes a bridge circuit 10 configured to receive an alternating input signal (an alternating input voltage) Vin at an input with a first input node 11 and a second input node 12. The rectifier circuit further includes an output with a first output node 31 and a second output node 32 coupled to the bridge circuit 10 and configured to output a rectified output signal (a rectified output voltage) Vout.

The bridge circuit 10 according to FIG. 1 is an active rectifier bridge and includes a first half-bridge 13 with a first high-side switch H1 and a first low-side switch L1, and a second half-bridge 14 with a second high-side switch H2 and a second low-side switch L2. The first high-side switch H1 and the first low-side switch L1 of the first half-bridge 13 are connected in series between a first output node 15 and a second output node 16 of the bridge circuit 10, and the second high-side switch H2 and the second low-side switch L2 of the second half-bridge 14 are connected in series between the first output node 15 and the second output node 16 of the bridge circuit 10. The output nodes 15, 16 of the bridge circuit are coupled to the output of the rectifier circuit.

Each of the switches H1-L2 of the bridge circuit 10 includes a control node, wherein control nodes of the first high-side switch H1 and the first low-side switch L1 are connected, and wherein the control nodes of the second high-side switch H2 and the second low-side switch L2 are connected. Each of the first and second half-bridges 13, 14 includes an input, wherein the input of the first half-bridge 13 is a circuit node common to load paths of the first high-side switch H1 and the first low-side switch L1, and wherein the input of the second half-bridge 14 is a circuit node common to load paths of the second high-side switch H2 and the second low-side switch L2. The input of the first half-bridge 13 and the control terminals of the second high-side switch H2 and the second low-side switch L2 are coupled to the first input node 11, and the input of the second half-bridge 14 and the control nodes of the first high-side switch H1 and the first low-side switch L1 are coupled to the second input node 12.

In the bridge circuit 10 of FIG. 1, the individual switches H1-L2 are implemented as transistors, in particular as MOSFETs (Metal-Oxide-Semiconductor Field-Effect Transistors). Specifically, the first high-side switch H1 and the second high-side switch H2 are transistors of first type, and the first low-side switch L1 and the second low-side switch L2 are transistors of a second type. According to one embodiment, the high-side switches H1, H2 are p-type MOSFETs, and the low-side switches L1, L2 are n-type MOSFETs. Each of these MOSFETs includes a gate terminal as a control node and a load path between a drain terminal and a source terminal. According to one embodiment, the high-side switches H1, H2 have their source terminals connected to the first output node 15 and the low-side switches L1, L2 have their source terminals connected to the second output node 16. The drain terminal of the first high-side switch H1 is connected to the drain terminal of the first low-side switch L1, and the drain terminal of the second high-side switch H2 is connected to the drain terminal of the second low-side switch L2.

It is commonly known that MOSFETs, like the MOSFETs used as high-side switches H1, H2 and the MOSFETs used as low-side switches L1, L2 in the bridge circuit 10 of FIG. 1, are voltage controlled switches that are switched on or switched off dependent on the level of their gate-source voltage. The gate-source voltage of one transistor is the voltage between the gate terminal and the source terminal of the transistor. In the bridge circuit of FIG. 1, the first high-side switch H1 is controlled by the voltage between the second input node 12 and the first output node 15, the first low-side switch L1 is controlled by the voltage between the second input node 12 and the second output node 16, the second high-side switch H2 is controlled by the voltage between the first input node 11 and the first output node 15, and the second low-side switch L2 is controlled by the voltage between the first input node 11 and the second output node 16. Each of the MOSFETs H1-L2 has a threshold voltage, wherein an individual MOSFET switches on (is conducting) when the magnitude of its gate-source voltage is higher than the magnitude of the threshold voltage. The high-side switches H1, H2 implemented with p-type MOSFETs in the present embodiment have a negative threshold voltage, and the low-side switches L1, L2 implemented with n-type MOSFETs in the present embodiment have a positive threshold voltage. For explanation purposes, it is assumed that one MOSFET is switched (is conducting, is in an on-state) as soon as the level of the corresponding gate-source voltage reaches the threshold voltage. In the on-state, an on-resistance and a conductance, respectively, varies dependent on the signal level of the gate-source voltage. When the level of the gate-source voltage is only slightly above the threshold voltage, an on-resistance of the MOSFET may be relatively high, and a conductance may be relatively low, respectively, wherein the on-resistance decreases (and the conductance increases) as the gate-source voltage increases.

The basic operating principle of the rectifier circuit of FIG. 1 is explained with reference to FIGS. 2A and 2B below. FIGS. 2A and 2B illustrate the operating states of the individual switches H1-L2 in the bridge circuit 10 dependent on the input voltage Vin, wherein FIG. 2A illustrates the operation states in case of a positive input voltage Vin, and FIG. 2B illustrates the operation states in case of a negative input voltage. When the input voltage Vin is positive, the electrical potential at the first input node 11 is higher than the electrical potential at the second input node 12, and when the input voltage Vin is negative, the electrical potential at the second input node 12 is higher than the electrical potential at the first input node 11.

For explanation purposes, it is assumed that an output capacitor 30 is connected between first and second output nodes 31, 32 of the rectifier circuit and that the output capacitor 30 has been previously charged to an output voltage Vout. FIGS. 2A and 2B show the input voltage Vin relative to the output voltage Vout and shows operation states of the individual switches H1-L2 of the bridge circuit. Referring to FIGS. 2A and 2B, $ST_{H1}$ represents the operation state of the first high-side switch H1, $ST_{L1}$ represents the operation state of the first low-side switch L1, $ST_{H2}$ represents the operation state of the second high-side switch H2, and $ST_{L2}$ represents the operation state of the second low-side switch L2. These signals $ST_{H1}$-$ST_{L2}$ will be referred to as state signals in the following. For explanation purposes, it is assumed that a high-level of a state signal represents an on-state of the corresponding switch, and a low-level of a state signal represents an off-state of the corresponding switch.

Referring to FIG. 2A, the second low-side switch L2 is switched on, when the input voltage Vin is higher than the threshold voltage $Vt_{L2}$ of the second low-side switch L2. In the on-state, the second low-side switch L2 connects the second input node 12 to the second output node 16 of the bridge circuit 10, so that the input voltage Vin and the output voltage Vout are referenced to the second output node 16 of the bridge circuit 10 and the second output node 32 of the rectifier circuit, respectively. The first high-side switch H1 is switched on as long as the input voltage Vin is positive and as long as a magnitude of the output voltage Vout is higher than a magnitude of the threshold voltage $Vt_{H1}$ of the first high-side switch H1. In the on-state, the first high-side switch H1 connects the first input node 11 to the first output node 15 of the bridge circuit 10. When the first high-side switch H1 and the second low-side switch L2 are switched on, an input current Iin can flow in the direction indicated in FIG. 1 from the first input node 11 via the first high-side switch H1 and the output capacitor 30 or a load Z (illustrated in dashed lines) coupled to the output terminals 31, 32, respectively, and the second low-side switch L2 to the second input node 12.

Referring to FIG. 2A, when the input voltage Vin falls below the output voltage Vout such that the input voltage Vin is more than the magnitude of the threshold voltage $Vt_{H2}$ of the second high-side switch H2 below the output voltage, the second high-side switch H2 is switched on. Thus, there is a voltage range $Vout-|Vt_{H2}|\le Vin\le|Vt_{L2}|$ of the input voltage Vin that causes both the second high-side switch H2 and the second low-side switch L2 to conduct. This may cause the output capacitor 30 to be partially discharged and may therefore result in undesirable losses.

Referring to FIG. 2B, the first low-side switch L1 is switched on, when the magnitude of the input voltage Vin is higher than the threshold voltage $Vt_{L1}$ of the first low-side switch L1. In the on-state, the first low-side switch L1 connects the first input node 11 to the second output node 16 of the bridge circuit 10, so that the negative input voltage –Vin and the output voltage Vout are referenced to the second output node 16 of the bridge circuit 10 and the second output node 32 of the rectifier circuit, respectively. The second high-side switch H2 is switched on as long as the input voltage Vin is negative and as long as a magnitude of the output voltage Vout is higher than a magnitude of the threshold voltage $Vt_{H2}$ of the second high-side switch H2. In the on-state, the second high-side switch H2 connects the second input node 12 to the second output node 16 of the bridge circuit 10. When the second high-side switch H2 and the first low-side switch L1 are switched on, an input current Iin can flow in the direction opposite the direction indicated in FIG. 1 from the second input node 12 via the second high-side switch H2 and the output capacitor 30 or the load Z, respectively, and the first low-side switch L1 to the first input node 11.

Referring to FIG. 2B, when the magnitude of the input voltage Vin falls below the output voltage Vout such that the magnitude of the input voltage Vin is more than the magnitude of the threshold voltage $Vt_{H1}$ of the first high-side switch H2 below the output voltage, the first high-side switch H1 is switched on. Thus, there is a voltage range Vout–|$Vt_{H1}$|≤–Vin≤|$Vt_{L1}$| of the input voltage Vin that causes both the first high-side switch H1 and the first low-side switch L1 to conduct. This may cause the output capacitor 30 to be partially discharged and may therefore result in undesirable losses.

Figure 3:
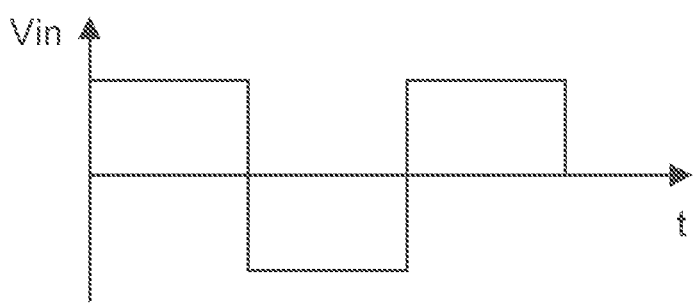
FIG. 3 schematically illustrates an input signal having a rectangular waveform.

Referring to the explanation in connection with FIGS. 2A and 2B, losses in the rectifier circuit of FIG. 1 may occur when a magnitude of the input voltage Vin is lower than the output voltage Vout minus the threshold voltage of the first high-side switch H1 or the second high-side switch H2. Thus, the rectifier circuit of FIG. 1 is suitable to rectify an input voltage Vin with a rectangular waveform as schematically illustrated in FIG. 3. In this case, the input voltage Vin alternatingly changes between a first (positive) signal level and a second (negative) signal level.

However, significant losses may occur in the rectifier circuit of FIG. 1, when the input voltage Vin is an alternating voltage in which the signal level changes slowly between a positive maximum level and a negative maximum level. In this case, there are significant time periods in which the input voltage Vin has a signal level in which the first high-side switch H1 and the first low-side switch L1 are both conducting or in which the second high-side switch H2 and the second low-side switch L2 are both conducting.

Figure 4:
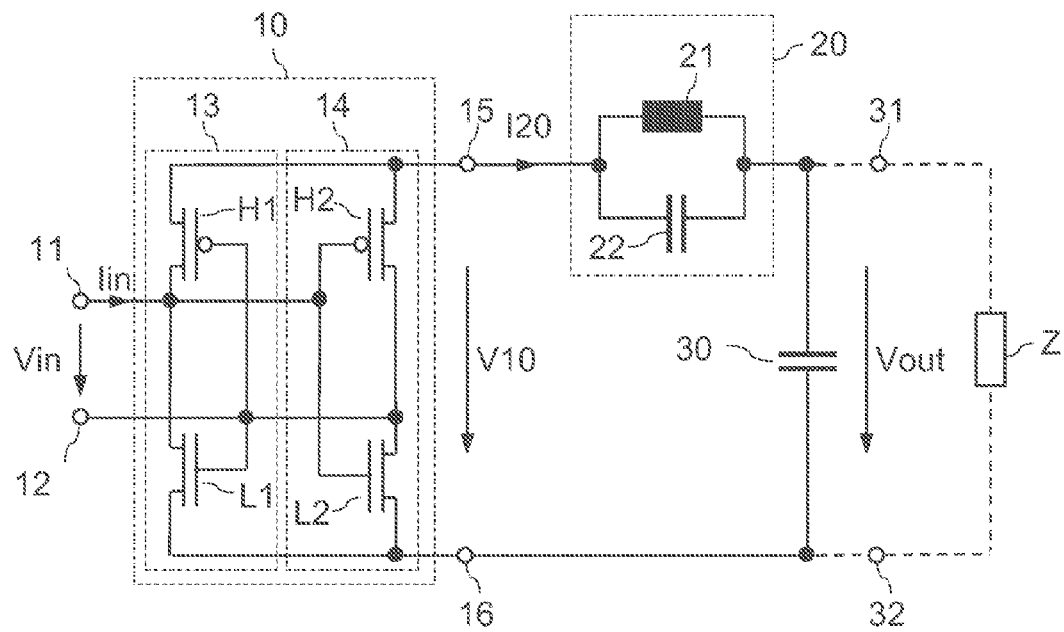
FIG. 4 illustrates one embodiment of a rectifier circuit including a bridge circuit and a parallel resonant circuit coupled between the bridge circuit and an output of the rectifier circuit.

FIG. 4 illustrates one embodiment of a rectifier circuit that is configured to overcome the problems outlined before. The rectifier circuit of FIG. 4 is, in particular, configured to rectify an alternating input voltage Vin that has not a rectangular waveform, but has a waveform in which a signal level changes relatively slowly between a positive maximum level and a negative maximum level. According to one embodiment, the input voltage Vin has a sinusoidal waveform or a waveform similar to a sinusoidal waveform.

The rectifier circuit of FIG. 4 is based on the rectifier circuit of FIG. 1 and additionally includes a parallel resonant circuit 20 connected between the output 15, 16 of the bridge circuit 10 and the output 31, 32 of the rectifier circuit. In the present embodiment, the parallel resonant circuit 20 is connected between the first output node 15 of the bridge circuit 10 and the first output node 31 of the rectifier circuit. The parallel resonant circuit is connected in series to the output capacitor 30, wherein the series circuit with the parallel resonant circuit and the output capacitor 30 is connected between the first and second output nodes 15, 16 of the bridge circuit 10. The output voltage Vout of the rectifier circuit is available across the output capacitor 30 between the first and second output nodes. The parallel resonant circuit 20 includes an inductor 21 and a capacitive storage element 22 connected in parallel with the inductor 21.

The operating principle of the rectifier circuit of FIG. 4 is explained with reference to FIG. 5 that shows timing diagrams of the input voltage Vin, of an output voltage V10 of the bridge circuit 10, and of the output voltage Vout. For explanation purposes, it is assumed that the input voltage Vin has a sinusoidal waveform, and that the output voltage Vout is substantially constant. However, this is only an example, the operating principle explained in the following is basically the same when the input voltage Vin has an alternating signal waveform other than a sinusoidal waveform, and when the output voltage Vout varies.

Referring to the explanation provided in connection with FIG. 2A, the first high-side switch H1 and the second low-side switch L2 are switched on when the input voltage Vin is higher than the output voltage Vout. This causes an input current to flow in the direction as indicated in FIG. 4 through the first high-side switch H1, the inductor 20 of the parallel resonant circuit 20, the output capacitor 30 and/or the load Z and the second low-side switch L2. As the input current Iin flows through the inductor 21 energy is magnetically stored in the inductor 21. As the input voltage Vin falls below the output voltage Vout minus the magnitude of the threshold voltage $Vt_{H2}$ of the second high-side switch H2 (at time t1 in FIG. 5) the second high-side switch H2 switches on so that both, the second high-side switch H2 and the second low-side switch L2 are conducting. However, the energy previously stored in the inductor 21 causes a current through the inductor 21 to continue to flow, wherein this current either charges the capacitive storage element of the parallel resonant circuit 22 or the output capacitor 30 and prevents that the output capacitor 30 is discharged by the conducting second high-side switch H2 and second low-side switch L2.

When the input voltage Vin turns negative and when the signal level of the negative input voltage rises above the output voltage Vout minus the threshold voltage of the first high-side switch H1, the second high-side switch H2 and the first low-side switch L1 are switched on. The input current Iin in this case flows from the second input node 12 through the second high-side switch H2, the inductor 21, the output capacitor 30 and/or the load Z, and the first low-side switch L1.

Figure 5:
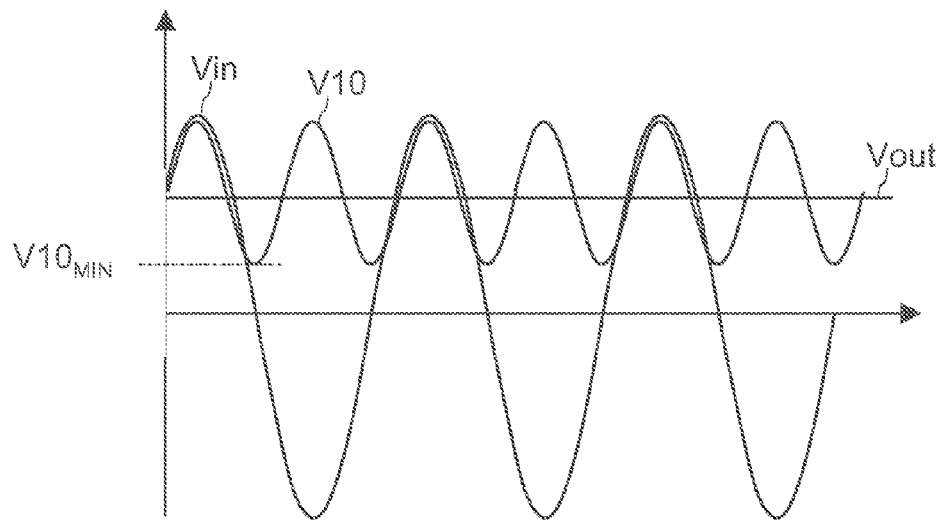
FIG. 5 shows timing diagrams illustrating the operating principle of the rectifier circuit of FIG. 4.

Referring to FIG. 5, the output voltage V10 of the bridge circuit is a rectified voltage that includes voltage ripples with a frequency that is substantially twice the frequency of the input voltage Vin. A minimum $V10_{MIN}$ of this output voltage V10 is substantially given by the sum of the threshold voltages of the high-side switch and the low-side switch of the first half-bridge 13 and the second half-bridge 14, that is:

$$V10_{MIN} = Vt_{H1} + Vt_{L1} \quad (1a)$$

$$V10_{MIN} = Vt_{H2} + Vt_{L2} \quad (1b).$$

When the output voltage V10 reaches the minimum $V10_{MIN}$ at least one of the switches of the first half-bridge is switched off so that the output voltage V10 cannot further decrease. According to one embodiment, a resonance frequency $f_{RES}$ of the parallel resonant converter 20 is in the range of twice the frequency $f_{IN}$ of the input voltage Vin. According to one embodiment, the resonance frequency $f_{RES}$ is between 50% and 200%, between 80% and 120%, or between 90% and 110% of twice the frequency of the input voltage. That is:

$$0.5 \cdot (2 \cdot f_{IN}) < f_{RES} < 2 \cdot (2 \cdot f_{IN}) \quad (2a)$$

$$0.8 \cdot (2 \cdot f_{IN}) < f_{RES} < 1.2 \cdot (2 \cdot f_{IN}) \quad (2b)$$

$$0.9 \cdot (2 \cdot f_{IN}) < f_{RES} < 1.1 \cdot (2 \cdot f_{IN}) \quad (2c).$$

Referring to FIG. 5, the output voltage V10 of the bridge circuit 10 has a direct component and an alternating component (the voltage ripples). For explanation purposes, it is assumed that the alternating component has a substantially sinusoidal waveform in FIG. 5. However, this is only an example. The operating principle explained below is not restricted to an output voltage V10 with a sinusoidal alternating component, but applies to an output voltage V10 with an alternating component having a waveform other than a sinusoidal waveform accordingly. The waveform of the alternating component is dependent on the waveform of the input voltage Vin of the bridge circuit.

The output voltage V10 of the bridge circuit 10 causes a current 120 through the parallel resonant circuit 20 to the output 31, 32. This current has a direct component (that flows through the inductor) resulting from the direct component of the output voltage V10. The alternating component of the output voltage V10 causes a current through the inductor 21 and through the capacitor 22. These currents have a phase difference of substantially 180°, wherein alternatingly the current through the inductor 21 charges the capacitor 22, and the charged capacitor 22 causes a current through the inductor 21 and magnetizes the inductor, and wherein the current that charges the capacitor and the current that magnetizes the inductor flow in opposite directions. The current through the inductor and the current through the capacitor at least partially compensate each other, so that substantially the direct component of the current 120 flows to the output 31, 32.

By virtue of the alternating current flowing in the parallel resonant circuit 20, substantially no current can flow from the output capacitor 30 through the bridge circuit 10 in those time periods in which the output voltage V10 is close to the minimum V10$_{MIN}$ and in which the two switches of one half-bridge 13, 14 are conducting.

Figure 6:
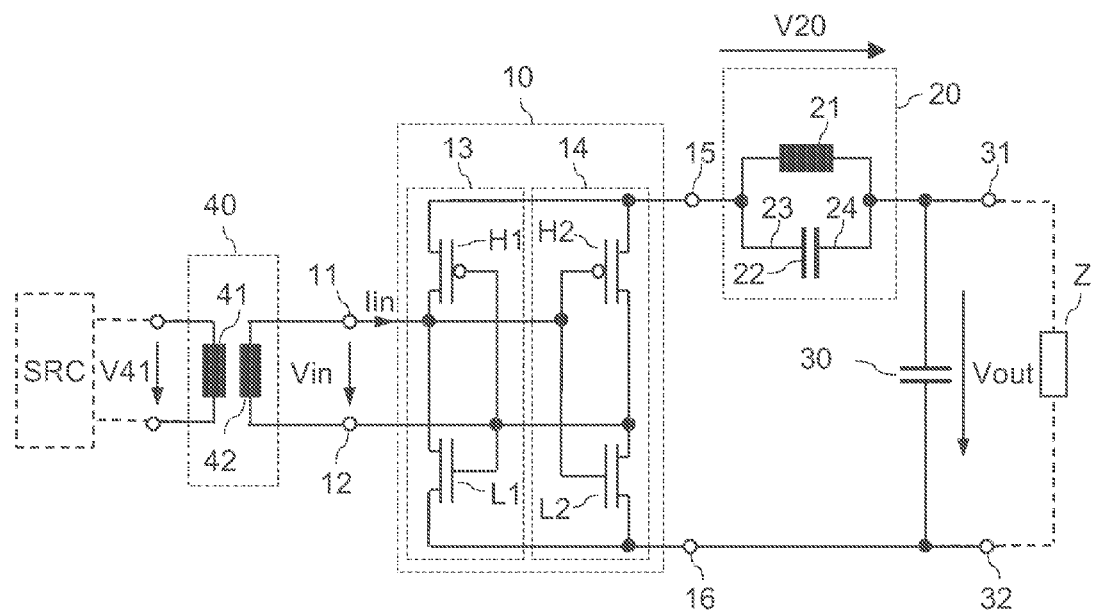
FIG. 6 illustrates a rectifier circuit that is based on the rectifier circuit of FIG. 3 and that additionally includes a transformer coupled to an input of the bridge circuit.

Referring to FIG. 6, the rectifier circuit explained with reference to FIG. 4 can be used to rectify a power signal transmitted over a transformer 40. Referring to FIG. 6, the transformer 40 includes a primary winding 41 and a secondary winding 42, wherein the secondary winding 42 is connected to the input nodes 11, 12 of the bridge circuit 10. In this case, the input voltage Vin of the bridge circuit 10 is a voltage available across the secondary winding 42 of the transformer. The waveform of the input voltage Vin is dependent on the waveform of a primary voltage V41 applied to the primary winding 41 of the transformer. This primary voltage V41 may have a rectangular waveform, or any other alternating waveform. In the embodiment of FIG. 6, the transformer 40 provides for a potential barrier between a voltage source (illustrated in dashed lines in FIG. 6) providing the primary voltage V41 and the rectifier circuit with the load Z connected thereto. Thus, the primary voltage V41 and the output voltage Vout can be referenced to different reference potentials.

According to one embodiment, the transformer 40 is a so-called coreless transformer that does not include a transformer core. This type of transformer can be implemented as an integrated transformer with planar windings. In order to efficiently transmit power over a transformer of this type, frequencies of the alternating primary voltage V41 of several 10 MHz, such as frequencies of between 100 MHz and 400 MHz are required. The frequency of the input voltage Vin of the bridge circuit substantially corresponds to the frequency of the primary voltage V41. However, due to inevitable stray capacitances of the transformer 40 and parasitic capacitances of the bridge circuit 10, a signal waveform of the input voltage Vin may be different from a signal waveform of the primary voltage V41. These capacitances act like a low-pass filter. When, for example, the primary voltage V41 has a rectangular waveform, the input voltage Vin may have a trapezoidal waveform, or a waveform with even smoother edges, similar to a sinusoidal waveform.

The rectifier circuit of FIG. 6 with the bridge circuit 10 and the parallel resonant circuit 20 is capable to efficiently rectify an alternating input voltage Vin with those relatively high frequencies.

According to one embodiment, the capacitive storage element 22 of the parallel resonant circuit 20 has a capacitance that is dependent on a voltage V20 across the parallel resonant circuit 20. According to one embodiment, the capacitance of the capacitive storage element 22 increases as the voltage V20 across the parallel resonant circuit 20 increases. According to one embodiment, the capacitive storage element 22 is implemented as a so-called MOS capacitor. One embodiment of this type of capacitor is illustrated in FIG. 7. Referring to FIG. 7, the capacitor includes a doped semiconductor substrate 221 connected to a first terminal 23 of the capacitive storage element, an electrode 222 connected to a second terminal 24 of the capacitive storage element 22, and a dielectric layer 223 arranged between the doped semiconductor substrate 21 and the electrode 22. The semiconductor substrate 221 may include a conventional semiconductor material, such as silicon, silicon carbide, gallium arsenide, or the like. The electrode 222 may include a conventional electrode material, such as, a highly doped polycrystalline semiconductor material or a metal. The semiconductor substrate 221 is a monocrystalline semiconductor substrate. The doping concentration of the semiconductor substrate is, for example, selected from a range of between 1E16 cm$^{-3}$ and 1E19 cm$^{-3}$.

The operating principle of the capacitive storage element 22 of FIG. 7 is as follows. Dependent on the voltage applied between the first and second terminals 23, 24 there can be a depletion region (space charge region) in the doped semiconductor substrate 221 below the dielectric layer 223. The overall capacitance of the capacitive storage element decreases as the depletion region expands deeper into the substrate 221. The capacitance reaches a maximum when there is an accumulation region in the semiconductor substrate 221 below the dielectric layer.

Figures 7A, 7B:
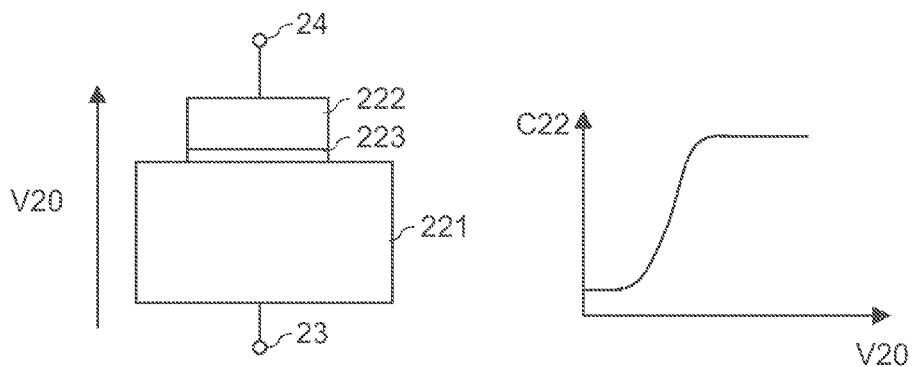
FIG. 7 (which includes FIGS. 7A and 7B) illustrates one embodiment of a capacitive storage element of the parallel resonant circuit.

For explanation purposes, it is assumed that the semiconductor substrate 221 is a p-doped semiconductor substrate. In this case, a negative potential of the electrode 222 relative to the electrical potential of the substrate 221 is required in order to generate an accumulation region in the substrate 221 below the dielectric layer 223, so that a capacitance C22 of the capacitor has a characteristic as schematically illustrated in FIG. 7B. Referring to FIG. 7B, the capacitance C increases when the voltage V20 has a polarity as indicated in FIG. 7A and when a voltage level of this voltage V20 increases. A capacitive storage element 22 of the type illustrated in FIG. 7A is connected in the parallel resonant circuit such that the first terminal 23 is connected to the first output node 15 of the bridge circuit 10 and that the second terminal 24 is connected to the first output node 31 of the rectifier circuit.

When the semiconductor substrate 221 is n-doped, a positive potential of the electrode 222 relative to the substrate 221 is required to generate an accumulation region in the substrate 221 below the dielectric layer 223. In this case, the polarity of the voltage V20 relative to the terminals 24, 25 is opposite to polarity shown in FIG. 7A, so that, in this case, the second terminal 24 is connected to the first output node 15 of the bridge circuit 10 and the first terminal 23 is connected to the first output node 31 of the rectifier circuit.

When the capacitor 22 has a characteristic curve as illustrated in FIG. 7B, the capacitor 22 has a relatively low capacitance when the bridge output voltage V10 is close to the minimum (and smaller than the output voltage Vout). This varying capacitance of the capacitor 22 has the effect that an oscillating voltage across the parallel resonant circuit 20 excited by the bridge voltage V10 has positive half-periods that are longer than the negative half-periods. This is, in particular, useful when the bridge voltage V10 has a similar waveform, that is, when "negative half-periods" of the ripples of the bridge voltage V10 are shorter than the "positive half-periods." This, for example, the case when the input voltage Vin of the bridge circuit 10 has a trapezoidal waveform.

Figure 8:
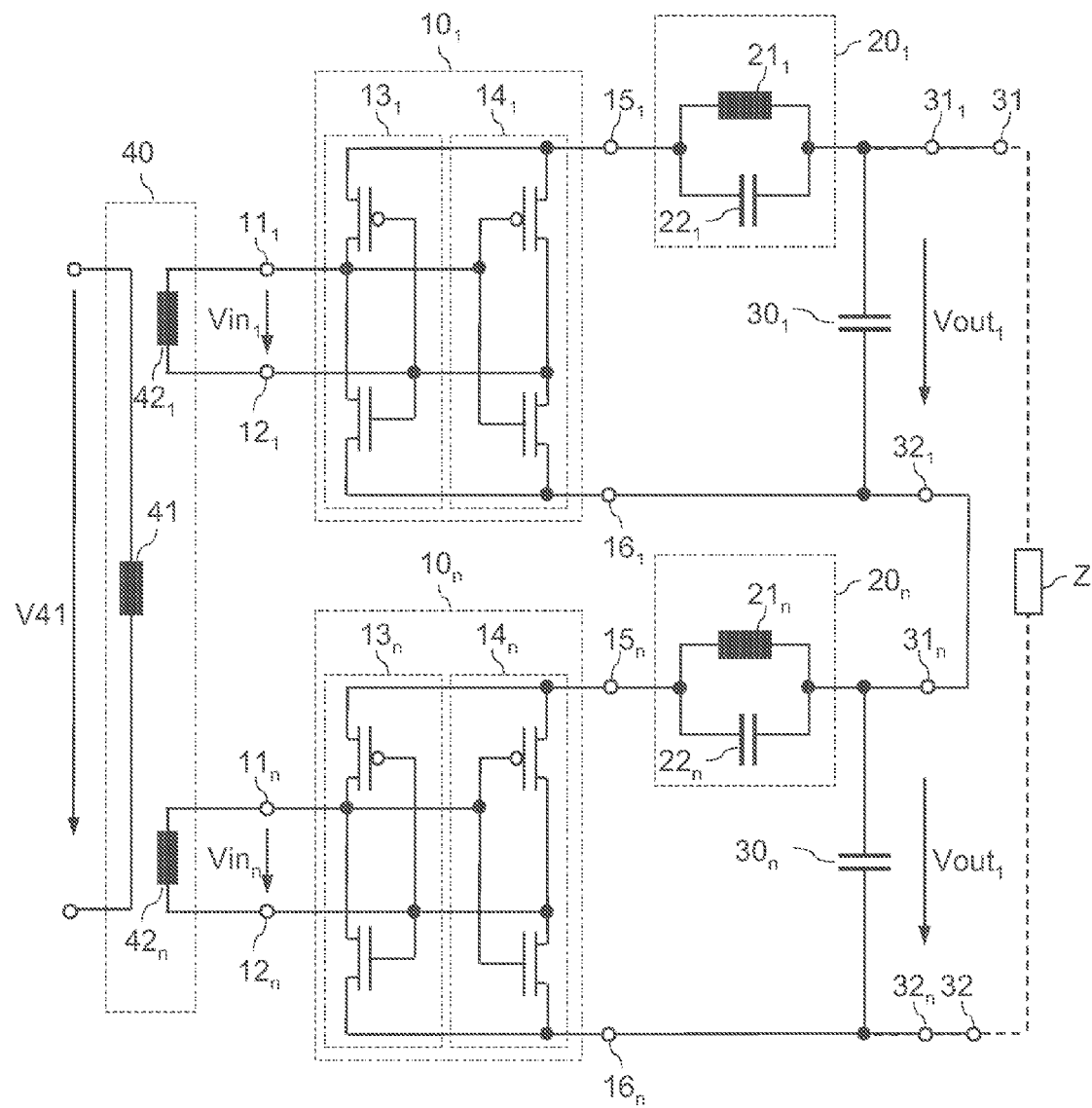
FIG. 8 illustrates a first embodiment of an electronic circuit including a plurality of cascaded rectifier circuits.

FIG. 8 illustrates an electronic circuit that includes a plurality of rectifier circuits explained with reference to FIGS. 2 to 7 hereinbefore. In the rectifier circuits of FIG. 8 corresponding features have corresponding reference characters that are only different in subscript indices. The electronic circuit of FIG. 8 includes two rectifier circuits. However, this is only an example. More than two rectifier circuits can be implemented in the electronic circuit as well. Referring to FIG. 8, the individual rectifier circuits are cascaded, that is output capacitors 30$_1$, 30$_n$ of the individual rectifier circuits are connected in series. Vout$_1$, Vout$_n$ denote output voltages of the individual rectifier circuits in FIG. 8. An overall output voltage Vout corresponds to the sum Vout$_1$+Vout$_n$ of the individual output voltages Vout$_1$, Vout$_n$. In FIG. 8, reference characters 31, 32 denote output nodes of the electronic circuit, that is, the output capacitors 30$_1$, 30$_n$ are connected in series between these output nodes 31, 32.

In the electronic circuit of FIG. 8, input voltages Vin$_1$, Vin$_n$ of the bridge circuits 10$_1$, 10$_n$ are secondary voltages available at secondary windings 42$_1$, 42$_n$ of a transformer 40. This transformer has one primary winding 41 that receives a primary voltage V41 and that is inductively coupled with the secondary windings 42$_1$, 42$_n$. The number of secondary windings 42$_1$, 42$_n$ corresponds to the number of cascaded rectifier circuit, so that each rectifier circuit receives its input voltage Vin$_1$, Vin$_n$ from one secondary winding 42$_k$, 42$_n$.

Figure 9:
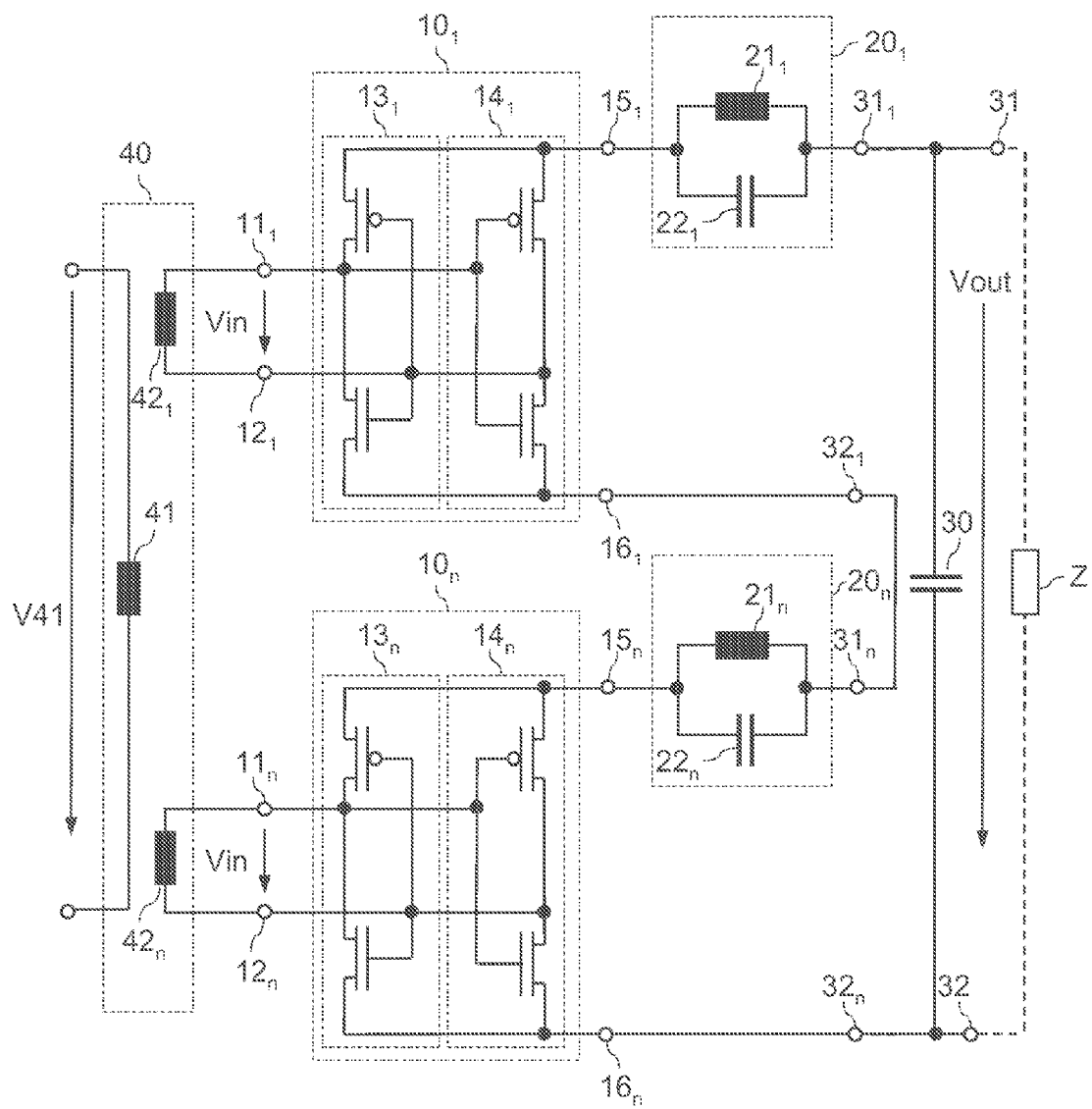
FIG. 9 illustrates a second embodiment of an electronic circuit including a plurality of cascaded rectifier circuits.

FIG. 9 shows an electronic circuit that is based on the electronic circuit of FIG. 8 and that is different from the electronic circuit of FIG. 8 in that there is one common output capacitor 30 connected between the output terminals 33, 34 of the electronic circuit, instead of an output capacitor (30$_1$, 30$_n$ in FIG. 8) in each rectifier circuit. According to a further embodiment (not illustrated), each of the rectifier circuits includes an output capacitor 30$_1$, 30$_n$ as illustrated in FIG. 8, and additionally one common output capacitor 30 as illustrated in FIG. 9 is connected between the output terminals 31, 32.

According to one embodiment, the inductors 22$_1$, 22$_n$ of the parallel resonant circuits 20$_1$, 20$_n$ of the individual rectifier circuits are inductively coupled. According to one embodiment, illustrated in FIG. 10, these inductors are implemented as planar coils on a substrate 200. Referring to FIG. 10, the coils 21$_1$, 21$_2$ can be spiral-shaped, and the spiral-shaped coils can be substantially concentric. The coils may include a conventional coil material, such as a metal, a highly doped polycrystalline semiconductor material, or the like.

FIG. 11 shows a rectifier circuit according to a further embodiment. This rectifier circuit includes a bridge circuit 10 explained with reference to FIG. 1 and, instead of the parallel resonant circuit 20 explained hereinbefore, includes a rectifier element 50 between the output of the bridge circuit 10 and the output 31, 32 of the rectifier circuit. In the embodiment of FIG. 11 the rectifier element 50 is connected between the second output node 16 of the bridge circuit 10 and the second output node 32 of the rectifier circuit. A polarity of the rectifier element 50 is such that the rectifier element prevents a current from the output 31, 32 of the rectifier circuit to the bridge circuit 10. Referring to FIG. 11, the rectifier element 50 can be implemented as a diode having a cathode terminal 52 connected to the second output node 16 of the bridge circuit 10 and having an anode terminal 51 connected to the second output node 32 of the bridge circuit. Alternatively, the rectifier element 50 could be connected between the first output node 15 of the bridge circuit 10 and the first output node 31 of the rectifier circuit 10.

Referring to FIGS. 12A and 12B, the rectifier element 50 can be implemented as diode-connected transistor. Referring to a first embodiment illustrated in FIG. 12A, the transistor could be a bipolar junction transistor (BJT) that has its base connected to its collector. Referring to a second embodiment illustrated in FIG. 12B, the transistor could be a MOS transistor (MOSFET) that has its gate connected to its drain. According to one embodiment, the diode-connected MOS transistor of FIG. 12B is implemented with a threshold voltage of substantially 0 V. In this case, the rectifier element 50 can be implemented with extremely low conduction losses.

According to one embodiment, a voltage blocking capability of the rectifier element 50 is lower than the output voltage Vout. The rectifier element 50 is reverse biased, so that it blocks, when the high-side switch and the low-side switch of one half-bridge 13, 14 are conducting at the same time. However, a voltage between the output 15, 16 of the bridge circuit 10 is at least the sum of the threshold voltages of the conducting high-side switch and of the conducting low-side switch. This reduces the voltage that reverse biases the rectifier element 50.

Figure 13:
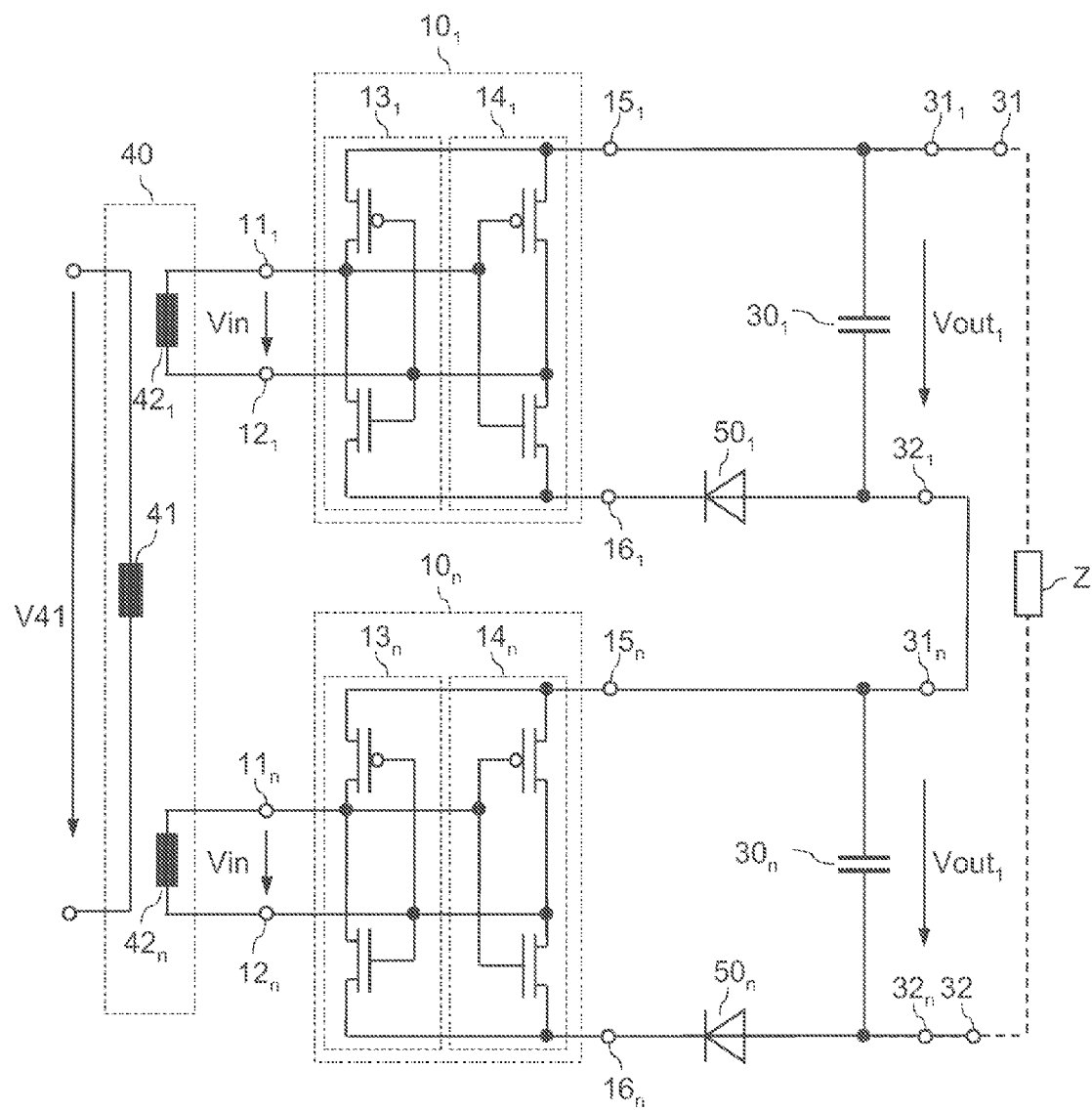
FIG. 13 illustrates a further embodiment of an electronic circuit including a plurality of cascaded rectifier circuits.

FIG. 13 illustrates an electronic circuit that corresponds to the electronic circuit of FIG. 8, but that is implemented with a plurality of rectifier circuits in accordance with FIG. 11. This electronic circuit of FIG. 13 could be modified as explained with reference to FIG. 9 to include only one output capacitor (30 in FIG. 9) connected between the output nodes of the electronic circuit.

The rectifier circuits explained hereinbefore or electronic circuits with a plurality of rectifier circuits explained herein before, can, in particular, be used in circuit applications where it is necessary to supply a load over a potential barrier. One example for this type of application is an electronic circuit that includes a drive circuit of a high-side switch.

Figure 14:
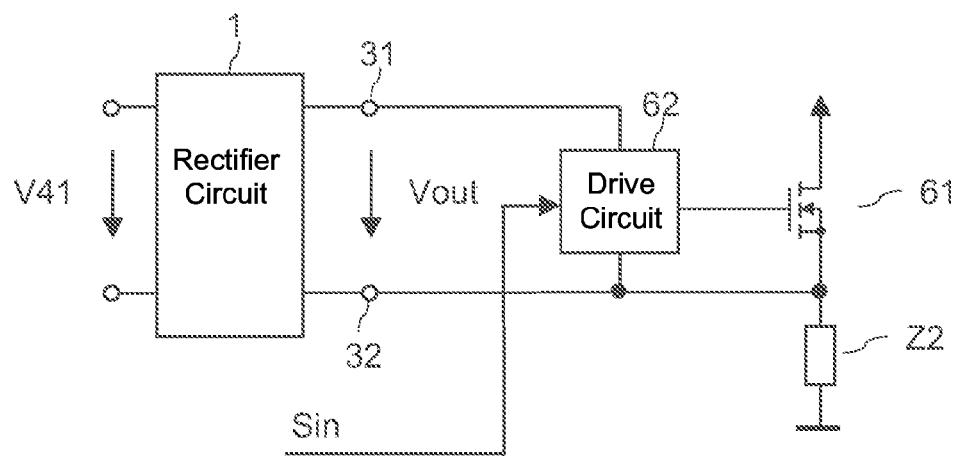
FIG. 14 illustrates an application circuit including a rectifier circuit.

FIG. 14 schematically illustrates an electronic circuit including a high-side switch 61 connected in series with a load Z2. A drive circuit 62 receives the output voltage Vout from a rectifier circuit 1. The rectifier circuit 1 of FIG. 14 represents one of the rectifier circuits or one of the electronic circuits with a plurality of rectifier circuits explained herein before that outputs a rectified output voltage Vout and receives a primary voltage V41. The drive circuit 62 further receives an input signal Sin that defines a desired switching state of the high-side switch 61. The drive circuit 62 is configured to switch on or switch off the high-side switch 62 dependent on the input signal Sin and using the output voltage Vout as the supply voltage.

The high-side switch is implemented as an n-type MOS transistor, specifically as an n-type MOSFET. The output voltage Vout of the rectifier circuit (the supply voltage of the drive circuit 62) is referenced to the source terminal of the high-side switch 61. The level of the source potential may vary dependent on the switching state of the high-side switch 61. However, this does not affect the generation of the output voltage Vout because the output voltage Vout and the power source (voltage source) generating the primary voltage V41 applied to the primary winding 41 of the transformer 40 are galvanically isolated by the transformer 40.

In the description hereinbefore, directional terminology, such as "top," "bottom," "front," "back," "leading," "trailing" etc., is used with reference to the orientation of the figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

It is to be understood that the features of the various embodiments described herein may be combined with each other, unless specifically noted otherwise.

What is claimed is:

1. A rectifier circuit, comprising:
   a bridge circuit configured to receive an alternating input signal; and
   a parallel resonant circuit coupled between the bridge circuit and an output, wherein the alternating input signal has an input frequency and wherein the parallel resonant circuit has a resonance frequency, wherein the resonance frequency is selected based on a value of the input frequency, and wherein the resonance frequency of the parallel resonant circuit is selected based on at least one relationship selected from the group consisting of:

$0.5 \cdot (2 \cdot f_{IN}) < f_{RES} < 2 \cdot (2 \cdot f_{IN})$, $0.8 \cdot (2 \cdot f_{IN}) < f_{RES} < 1.2 \cdot (2 \cdot f_{IN})$, and $0.9 \cdot (2 \cdot f_{IN}) < f_{RES} < 1.1 \cdot (2 \cdot f_{IN})$, where $f_{RES}$ is the resonance frequency and $f_{IN}$ is the frequency of the input signal.

2. The rectifier circuit of claim 1, further comprising a capacitive storage element coupled to the output and configured to provide an output signal.

3. The rectifier circuit of claim 2, wherein the parallel resonant circuit and the capacitive storage element are connected in series.

4. The rectifier circuit of claim 1, wherein the resonance frequency of the parallel resonance circuit is selected based on an inductance of an inductor and a capacitance of a capacitor.

5. The rectifier circuit of claim 1, wherein the parallel resonant circuit comprises an inductor and a second capacitive storage element connected in parallel with the inductor.

6. The rectifier circuit of claim 5, wherein the second capacitive storage element comprises a MOS capacitor.

7. The rectifier circuit of claim 6, wherein the MOS capacitor comprises:
   a doped semiconductor substrate coupled to a first capacitor terminal;
   an electrode coupled to a second capacitor terminal; and
   a dielectric layer between the doped semiconductor substrate and the electrode.

8. The rectifier circuit of claim 1, further comprising a transformer comprising a primary winding and a secondary winding, wherein the secondary winding is configured to output the alternating input signal of the bridge circuit.

9. The rectifier circuit of claim 1, wherein the bridge circuit comprises:
   a first half-bridge coupled between a first input node and a first output node and a second output node of the bridge circuit; and
   a second half-bridge coupled between a second input node and the first output node and the second output node of the bridge circuit,
   wherein the alternating input signal is received at the first and second input nodes.

10. The rectifier circuit of claim 9,
    wherein the first half-bridge comprises a first high-side switch coupled between the first input node and the first output node, and a first low-side switch coupled between the first input node and the second output node, and
    wherein the second half-bridge comprises a second high-side switch coupled between the second input node and the first output node, and a second low-side switch coupled between the second input node and the second output node.

11. The rectifier circuit of claim 10,
    wherein the first high-side switch and the first low-side switch each comprise a control terminal coupled to the second input node; and
    wherein the second high-side switch and the second low-side switch each comprise a control terminal coupled to the first input node.

12. The rectifier circuit of claim 10, wherein the first high-side switch, the first low-side switch, the second high-side switch, and the second low-side switch each comprise a transistor.

13. The rectifier circuit of claim 1, further comprising:
   a further bridge circuit configured to receive a further alternating input signal; and
   a further parallel resonant circuit coupled between the further bridge circuit and a further output, wherein the further output is configured to output a further output signal,
   wherein the output of the bridge circuit and the further output of the further bridge circuit are connected in cascade.

14. An electronic circuit comprising a plurality of rectifier circuits,
   wherein each rectifier circuit comprises a bridge circuit configured to receive an alternating input signal, and a parallel resonant circuit coupled between the bridge circuit and an output,
   wherein the outputs of the rectifier circuits of the plurality of rectifier circuits are cascaded,
   wherein the alternating input signal has an input frequency and wherein the parallel resonant circuit has a resonance frequency,
   wherein the resonance frequency is selected based on a value of the input frequency, and
   wherein the resonance frequency of the parallel resonant circuit is selected based on at least one relationship selected from the group consisting of:

$$0.5 \cdot (2 \cdot f_{IN}) \leq f_{RES} \leq 2 \cdot (2 \cdot f_{IN}),$$

$$0.8 \cdot (2 \cdot f_{IN}) \leq f_{RES} \leq 1.2 \cdot (2 \cdot f_{IN}), \text{ and}$$

$$0.9 \cdot (2 \cdot f_{IN}) \leq f_{RES} \leq 1.1 \cdot (2 \cdot f_{IN}),$$

where $f_{RES}$ is the resonance frequency and $f_{IN}$ is the frequency of the input signal.

15. The electronic circuit of claim 14,
   wherein the parallel resonant circuit of each rectifier circuit comprises an inductor; and
   wherein the inductors of the parallel resonant circuits of the plurality of rectifier circuits are inductively coupled.

16. The electronic circuit of claim 15, wherein each of the inductors comprises a planar winding.

17. The electronic circuit of claim 14, further comprising a transformer comprising one primary winding and a plurality of secondary windings wherein each of the plurality of secondary windings is coupled to the bridge circuit one of the plurality of rectifier circuits and wherein each bridge circuit of one of the plurality of rectifier circuits has a secondary winding connected thereto.

18. The electronic circuit of claim 14, wherein the outputs of the rectifier circuits of the plurality of rectifier circuits are cascaded such that a first output node of one of the plurality of rectifier circuits is connected to a second output node of another one of the plurality of rectifier circuits.

* * * * *